July 9, 1968 C. R. FLATAU 3,391,804
COUNTERBALANCED MANIPULATOR
Filed June 14, 1966 3 Sheets-Sheet 1

INVENTOR.
CARL R. FLATAU
BY

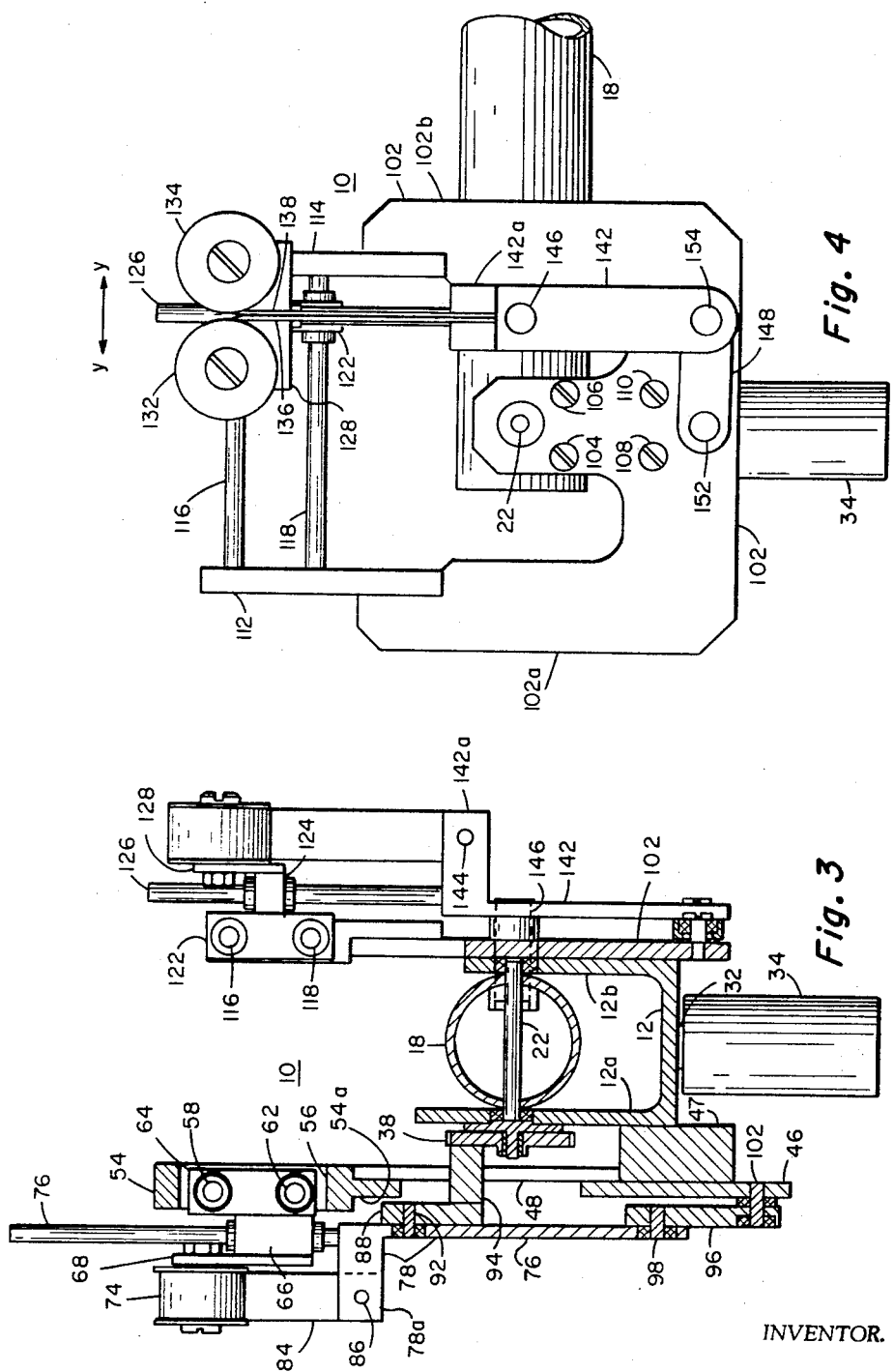

July 9, 1968   C. R. FLATAU   3,391,804
COUNTERBALANCED MANIPULATOR

Filed June 14, 1966   3 Sheets-Sheet 3

INVENTOR.
CARL R. FLATAU
BY

United States Patent Office 3,391,804
Patented July 9, 1968

3,391,804
COUNTERBALANCED MANIPULATOR
Carl R. Flatau, Shoreham, N.Y., assignor to the United States of America as represented by the United States Atomic Energy Commission
Filed June 14, 1966, Ser. No. 558,216
4 Claims. (Cl. 214—1)

ABSTRACT OF THE DISCLOSURE

This invention relates to a counterbalanced manipulator in which gravitational forces are neutralized by the variable application of a spring force. An analog arrangement is provided to make the correct applications of forces for every position of each movable arm comprising the manipulator.

---

The invention described herein was made in the course of, or under a contract with the U.S. Atomic Energy Commission.

Background of the invention

Recent developments in the accelerator building field include greater attention to the production of high energies as well as that of high beam currents. Higher beam currents induce increased radioactivity which in turn poses some very severe handling problems.

While handling problems in radioactive environment are not new and solutions have been found for a great variety of them, accelerators have some peculiarities which add entirely new facets to the subject. A typical high beam power accelerator is not only a very expensive and complex device but is usually also unique. This results in a large demand on its use which requires a very tight operational schedule with minimum allowance for meeting maintenance time requirements. Also, the very nature of particle physics requires that substantial portions of the machine be rather frequently modified. In addition to this, a typical accelerator is housed in a heavily shielded tunnel whose length or circumference might measure between one-half to several miles and which must, because of its very length, be of minimum cross section.

In view of the overall complexity and the restriction of maintenance time in modern accelerators, general purpose manipulators of utmost compactness and highest obtainable dexterity are required. In general, this tends to limit the choice of manipulator systems to that of servo master-in-slave devices which provide a force feedback to the operator in order to obtain the desired dexterity. This feedback should be of great sensitivity in order to overcome the deficiencies inherent in remote monitoring and so avoid the application of excessive forces unknowingly exerted on fragile parts of the accelerator. Previous attempts at this relied on using average values, adjustment in steps or using counterweights, the latter introducing inertial and weight problems.

Description of the invention

In accordance with this invention, a sensitive force feedback and avoidance of the other problems mentioned above are made possible by providing a remotely actuated manipulator mechanism in which the moving parts are balanced against gravitational forces to a degree of accuracy heretofore unobtainable. The objects and advantages of this invention will become readily apparent from the following description of a preferred embodiment of this invention taken with reference to the accompanying drawings in which:

FIG. 3 is a view along 3—3 of the device shown in FIG. 2;

FIG. 4 is a back elevation view of the device shown in FIG. 2; and

Figure 1:
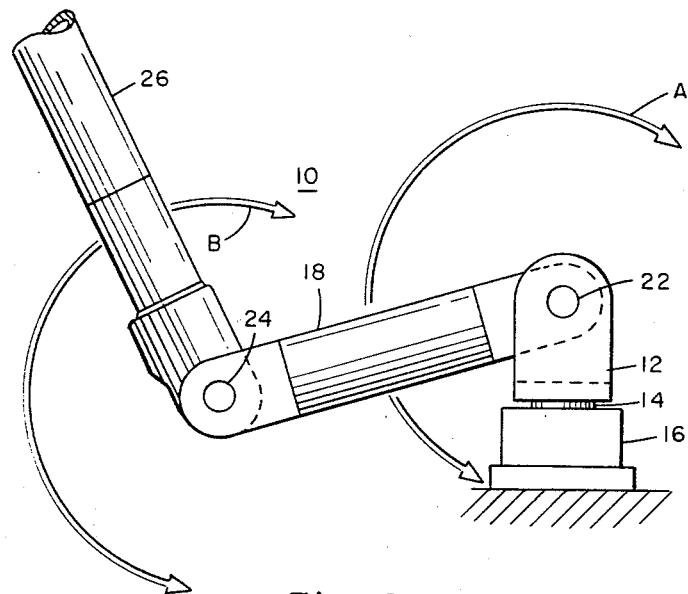
FIG. 1 illustrates a manipulator assembly of the type which may incorporate this invention.

Referring to FIG. 1, manipulator assembly 10 consists of a bracket 12 which is mounted for rotation about a vertical shaft 14 supported by a stationary support structure 16. An upper arm 18 is supported at one end by a shaft 22 in bracket 12 while at the opposite end of arm 18 is mounted a second shaft 24. A lower arm 26 is mounted at one end of shaft 24 while at the other end (not shown) would be mounted an appropriate mechanism such as a tong or other handling device by which some desired function can be carried on. Arms 18 and 26 may be hollow cylindrical members containing manipulative components not forming a part of this invention.

Bracket 12 is rotatable in azimuth about its vertical shaft 14 while upper arm 18 would be rotatable as shown by arrow A around shaft 22. In a similar fashion lower arm 26 would be rotatable as shown by arrow B around shaft 24. In this way it is readily apparent that manipulator assembly 10 has several degrees of freedom. Servo motors and drive cables of conventional type, which are not shown, would be used to effect the various movements and rotations just described. As will be further described, manipulator 10 is provided with an arrangement in accordance with this invention to balance or cancel out the gravitational forces and moments imposed by the weights of arms 18 and 26. It is readily seen that the moments caused by the gravitational forces vary depending upon the positions of these arms. In the past, typically, an "average" such moment would be calculated and the value arrived at would be balanced out. Under such arrangement, however, there is almost always some unbalanced moment which reduces, accordingly, the sensitivity and the "feel" of the device when a force feedback is utilized. By this invention, these moments are balanced out exactly for all positions of arms 18 and 26 by the application of the necessary continuously variable forces.

Figure 2:
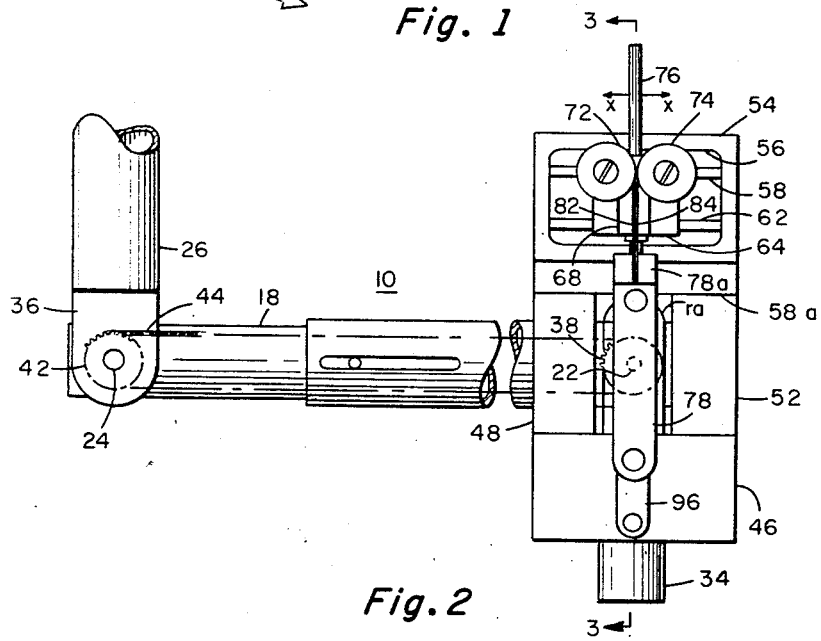
FIG. 2 is an elevation view of a preferred embodiment of this invention.

Referring to FIGS. 2, 3 and 4, manipulator 10 is shown in greater detail and incorporating the features of this invention. Bracket 12 is fork-shaped and is supported by and is integrally attached to a vertical shaft 32 which is supported by a pedestal 34. While not shown, shaft 32 is mounted in bearings in pedestal 34 for free rotational movent thereby permitting bracket 12 to rotate freely with shaft 32.

Upper arm 18 is mounted for rotation near one end on shaft 22 which is supported across fork members 12a and 12b of bracket 12, as best seen in FIG. 3. Lower arm 26 terminates at its upper end in a fork-shaped bracket 36 which supports shaft 24.

A toothed wheel 38 is mounted on an extension of shaft 22 outside of bracket 12 for rotation with respect thereto and a similar toothed wheel 42 is mounted on an extension of shaft 24 on the outside of forked member 36. Wheel 42 is integrally connected to member 36 so that rotation of the former causes rotation of the latter. An endless chain 44 looped over wheels 38 and 42 interconnects them in a driving relationship. Hence, rotation of wheel 38 will cause the rotation of lower arm 26 about shaft 24. Rotation of wheel 38 is completely independent of any rotation of upper arm 18.

In order to effect the drive of wheel 38 there is provided on the outside of fork member 12a a plate 46 mounted on a spacer block 47. Plate 46 supports a pair of spaced, vertically extended flat members 48 and 52 which may be welded or attached to plate 46 in any convenient fashion. At the upper ends of members 48 and 52 is a rod retainer 54 attached in convenient fashion to members 48 and 52. Rod retainer 54 is a flat rectangular plate with a bottom extension 54a for support and a rectangular opening 56 which gives it a picture frame appearance. A pair of horizontal rods 58 and 62 extend across opening 56 and are supported by the vertical walls of retainer 54. The purpose of rods 58 and 62 is to support a bearing mounting block 64 through which rods 58 and 62 pass so that block 64 may be freely slideable as shown by doubleheaded arrow X—X along the width of opening 56. Block 64 would be provided with suitable bearings to permit friction free movement on rods 58 and 62 while the latter members may be greased for this same purpose. Block 64 supports a member 66 and a plate 68 carrying a pair of drums 72 and 74 arranged in tandem as shown. Block 66 accommodates a vertically extending shaft 76 which is free to slide vertically through block 66 which thus would be provided with an appropriate bearing and lubrication to facilitate this movement. The bottom of shaft 76 terminates in the shoe portion 78a of an L-shaped link 78 whose main body extends vertically.

Wrapped around drums 72 and 74 are a pair of negator springs 82 and 84 the free ends of which extend vertically downward and are attached to shoe portion 78a of link 78. If shoe portion 78a is provided with a slot to accommodate the ends of springs 82 and 84 as illustrated, a rollpin 86 may be used to maintain this connection. As is understood in the art, negator springs 82 and 84 in their normal, contracted positions are tightly wound around drums 72 and 74. As the springs are unwound from drums 72 and 74 by the downward movement of link 78, upward force is exerted by each of the negator springs, and as is characteristic of the negator spring, this force is the same for any degree of unwind of the springs. Thus a uniform upward force is maintained by negator springs 82 and 84 over all positions of link 78.

In order to transmit the force of negator springs 82 and 84 to toothed wheel 38, link 78 is provided with a drive link 88 (see FIGS. 3 and 5) which at one end is attached by way of a pin 92 to link 78 and at the other end is attached by way of a block 94 to wheel 38 as is illustrated. Block 94 is attached rigidly to wheel 38 in convenient fashion remaining radially aligned as shown. An idler link 96 connected to the lower end of link 78 by way of pin 98 and to plate 46 by way of pin 102 help to insure vertical alignment of link 78. Pin 102 is located on a vertical axis below the center of rotation of wheel 38. Hence, link 78 is free to rotate about wheel 38 while maintaining its vertical alignment.

Figure 5:
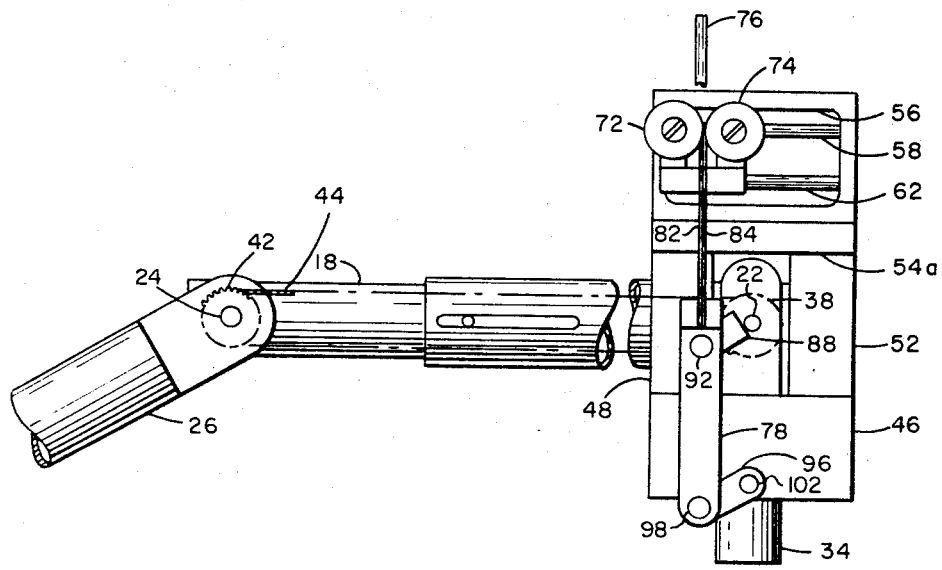
FIG. 5 is a view similar to that of FIG. 2 with the lower arm rotated into another position.

Referring to FIG. 5, it will be seen that the upward force exerted by negator springs 82 and 84 is transmitted to link 78 which acts on drive link 88 to rotate toothed wheel 38 in a clockwise direction. It is readily apparent that the weight of lower arm 26, tending to rotate the latter counter-clockwise around shaft 24 is opposed by the force exerted on it from springs 82 and 84 by way of toothed wheel 38, chain drive 44, and toothed wheel 42. With the proper selection of negator springs 82 and 84 and initial orientation or alignment of wheels 38 and 42 it is seen that for any position of arm 26 the moment caused by gravity can be exactly balanced by the effect of negator springs 82 and 84. Another way to express this result is that the moment arm of the weight of arm 26 acting around shaft 24 is a function of the cosine of the angle that arm 26 makes with the horizontal while in a similar fashion the moment exerted by the force of negator springs 82 and 84 on wheel 38 is a direct function of the cosine of the angle drive link 88 makes with the horizontal. In FIG. 2, where arm 26 is in a vertical position, there would be no moment about shaft 24 due to weight of arm 26 so that no net balancing force or moment is required. Link 88 is also in a vertical position, and the cosine of the 90° angle is zero.

In order to balance the moment around shaft 22 caused by the weights of arms 18 and 26, reference is again made to FIGS. 2, 3 and 4. It will be seen that fork 12b of bracket 12 is provided with a plate 102 attached by way of screws 104, 106, 108 and 110. A pair of vertical arms 102a and 102b of plate 102 supports a pair of vertical posts 112 and 114 which in turn support the ends of a pair of horizontal shafts 116 and 118. A bearing mounting block 122 with appropriate openings to accommodate shafts 116 and 118 is supported as shown to slide back and forth in a horizontal direction as shown by double headed arrows Y—Y. Mounted on block 122 is a block 124 with a vertical opening to accommodate a vertically disposed shaft 126 which will be further described below. Block 124 in turn supports a plate 128 which has mounted thereon a pair of drums 132 and 134 situated in tandem. Drums 132 and 134 have wound thereon a pair of negator springs 136 and 138, respectively, the ends of which come down together and are attached to an L-shaped drive link 142. The shoe portion 142a of link 142 is provided with a roll pin 144 to fix the ends of springs 136 and 138. The latter exert a uniform upward force on drive link 142. Vertically extending shaft 126 is attached at its bottom end also to the shoe portion 142a of link 142 so that shaft 126 will slide up and down through block 124.

Link 142 is provided with a pin or shaft 146 connecting the former to upper arm 18. As arm 18 rotates about shaft 22 supported by bracket 12, drive link 142 will follow. To maintain the latter in a vertical position an idler link 148 connected by way of pins 152 and 154 interconnects link 142 with plate 102.

From FIG. 4 it is readily apparent that negator springs 136 and 138 exert an upward moment about the axis of shaft 22 on upper arm 18 which opposes the downward moment caused by the combined weight of upper and lower arms 18 and 26, the latter's weight being applied where hinged, i.e., at shaft 24. By the proper selection of negator springs 136 and 138 it is possible to cancel or neutralize all of the unbalancing moments. It will also be seen that as arm 18 rotates away from the horizontal position as illustrated, and the moment arm shortens, a similar shortening of the moment arm for the negator spring force occurs, and in the manner described in connection with the balancing of lower arm 26, there is a continuously maintained balance for all positions of upper arm 18 within the range of possible movements of arms 18 and 26.

In the operation of the apparatus just described, it is readily apparent that the forces exerted by the two sets of negator 82, 84 and 136, 138 act independently of each other balance out perfectly the moments due to gravitational forces acting on the upper and lower arms 18 and 26. Basically, the arrangements just described for accomplishing this result are quite simple for solving what otherwise is a complicated situation where there is an unlimited number of possible combinations of positions of these arms.

It is thus seen that there has been provided a unique, reliable, and simple arrangement for counterbalancing a manipulator device. While only a preferred embodiment of the invention has been described it is understood that many variations are possible without departing from the principles of this invention. Therefore the scope of the invention is not to be limited by the embodiment described but is to be defined by the scope of the appended claims.

What is claimed is:
1. A counterbalanced manipulator comprising:
 (a) means pivotally mounting an extended upper arm at one end thereof;
 (b) means pivotally mounting one end of an extended lower arm at the free end of said upper arm;
 (c) means for neutralizing the unbalancing moments due to the weight of said lower arm in any position about its pivotal mounting consisting of a first spring producing a constant force, analog means for converting said force into a moment equal and opposite to the then unbalancing moment of said lower arm about its pivotal mounting, and means for transferring the balancing moment to said lower arm for the neutralization thereof; and (d) means for neutralizing the unbalancing moments due to the weights of said lower and upper arms about the pivotal mounting of said upper arm consisting of a second spring producing a constant force, analog means for converting the force into a moment equal and opposite to the then combined unbalancing moment of said lower and upper arms about the pivotal mounting of said upper arm, and means for transferring said balancing moment to said upper arm for the neutralization of the combined unbalancing moment.

2. A counterbalanced manipulator comprising:
(a) means pivotally mounting an extended lower arm at one end thereof;
(b) means consisting of a spring for producing a constant force; and
(c) analog means for converting said force into a variable balancing moment equal to and opposite the then unbalancing moment due to gravity of said lower arm about its pivotal mounting including means to transfer said balancing moment to cancel said unbalancing moment thereby maintaining said lower arm in a continuous state of balance.

3. The manipulator of claim 2 having (a) an extended upper arm pivotally mounted at one end, the opposite end thereof forming the pivotal mounting for said lower arm;
(b) means consisting of a spring for producing a second constant force;
(c) analog means for converting said second force into a second variable balancing moment equal to and opposite the then unbalancing moment due to gravity of said upper and lower arms about the pivotal mounting of said upper arm including means to transfer said second balancing moment to cancel the unbalancing moment of said arms thereby maintaining said upper and lower arms in a continuous state of balance for all positions and combinations of positions of said arms.

4. The manipulator of claim 3 in which each of said force producing spring is a negator spring.

References Cited
UNITED STATES PATENTS

| | | | |
|---|---|---|---|
| 3,086,552 | 4/1963 | Ragsdale | 137—615 |
| 3,280,991 | 10/1966 | Melton | 214—1 |
| 3,340,907 | 9/1967 | Bily | 137—615 X |

ROBERT G. SHERIDAN, *Primary Examiner.*

GERALD M. FORLENZA, *Examiner.*

G. F. ABRAHAM, *Assistant Examiner.*